Nov. 30, 1948.  P. E. COOLEY  2,455,299
METHOD FOR MAKING VALVES
Filed April 18, 1945  3 Sheets-Sheet 1
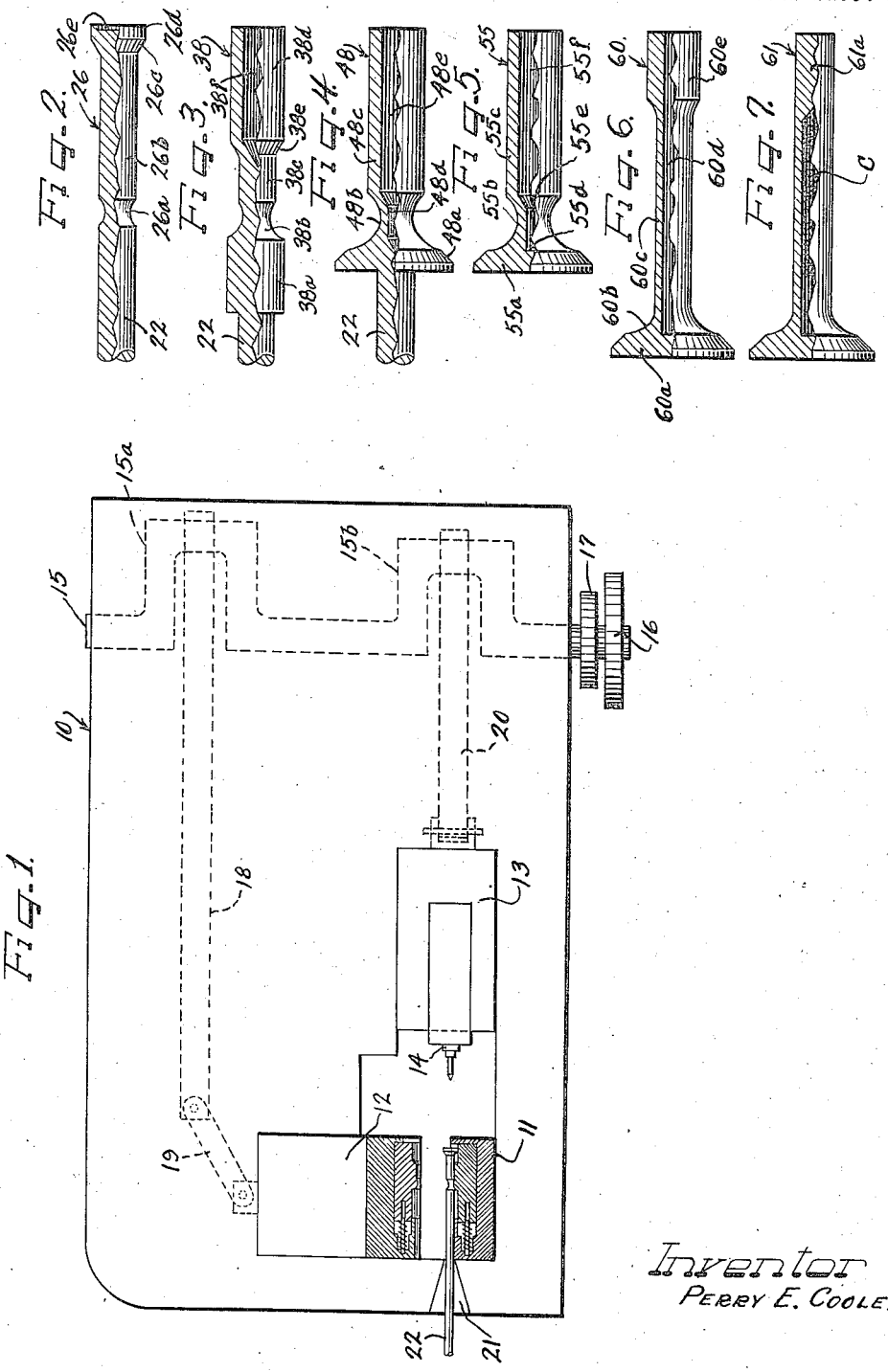
Inventor
PERRY E. COOLEY

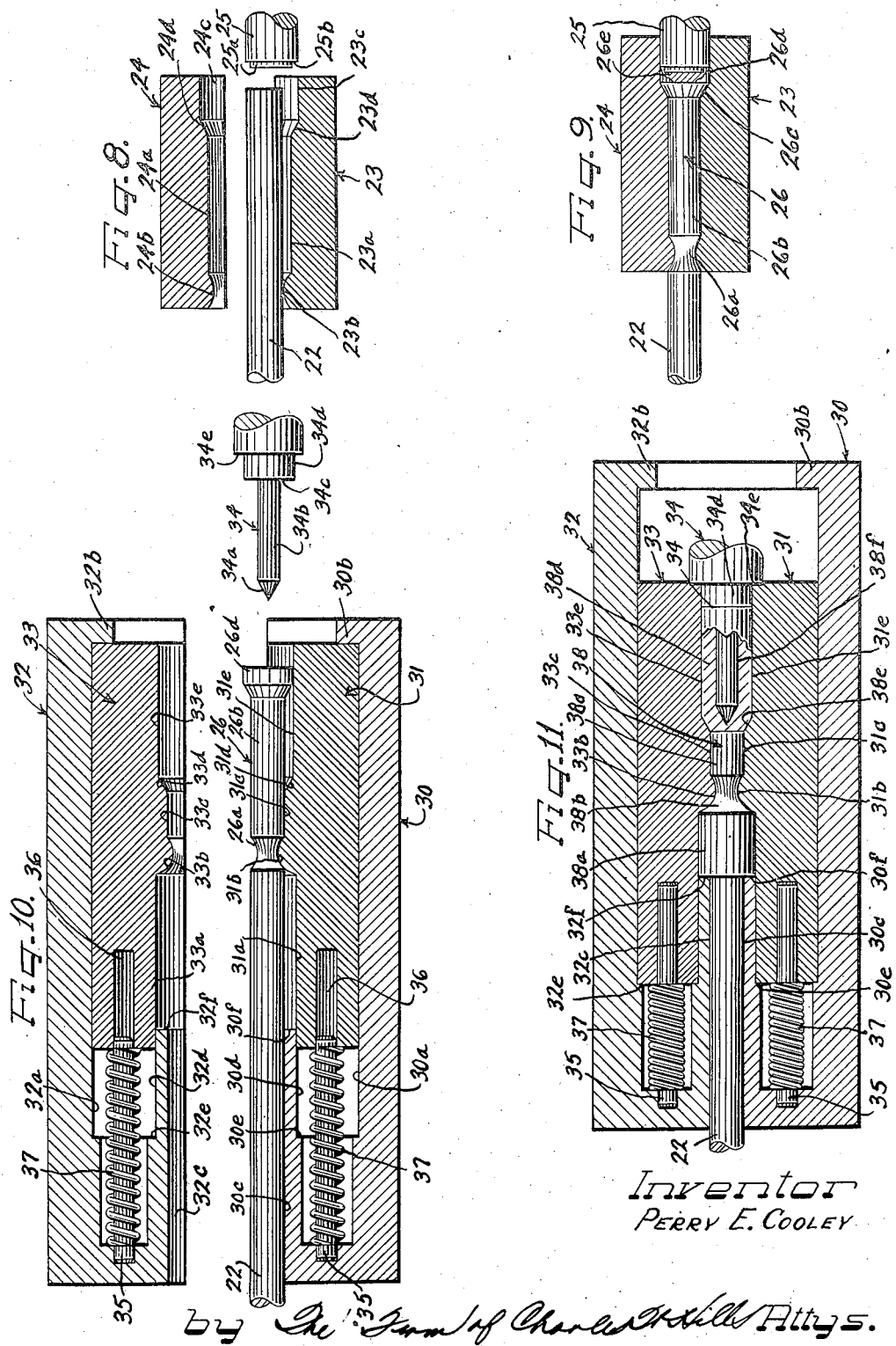

Nov. 30, 1948.    P. E. COOLEY    2,455,299
METHOD FOR MAKING VALVES
Filed April 18, 1945    3 Sheets-Sheet 3
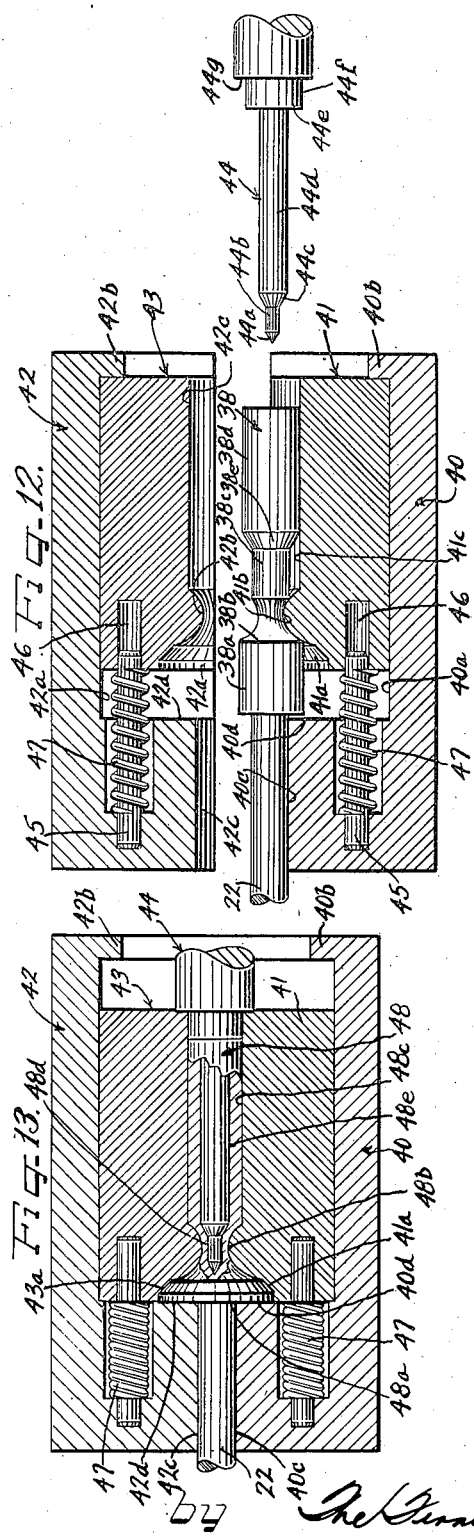
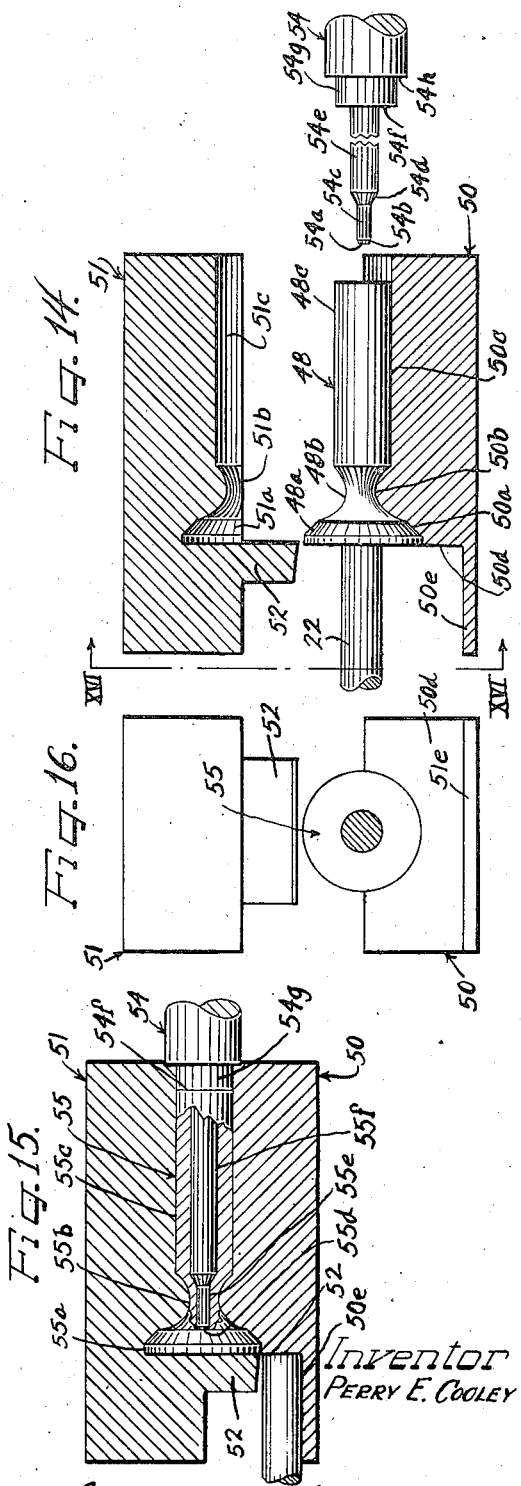
Inventor
PERRY E. COOLEY Patented Nov. 30, 1948

2,455,299

UNITED STATES PATENT OFFICE 2,455,299

METHOD FOR MAKING VALVES

Perry E. Cooley, Cleveland, Ohio, assignor to Thompson Products, Inc., Cleveland, Ohio, a corporation of Ohio Application April 18, 1945, Serial No. 588,922

10 Claims. (Cl. 29—156.7)

This invention relates to the production of hollow valves from solid bar stock on a header machine. Specifically this invention deals with the production of hollow stem poppet valves from heated solid rods by upsetting portions of the rods in a series of sequential steps to produce a blank having a poppet valve head, a poppet valve neck, and a thickened hollow stem which can be extruded down to valve stem diameter for forming the finished valve.

In accordance with this invention a header machine is equipped with shaping dies and plungers or piercing tools for sequentially acting upon a length of bar stock to form a poppet valve blank which is severed from the bar stock only after the last upsetting operation. The poppet valve blank so produced is extruded into finished poppet valve shape. Only four upsetting operations are necessary to form the hollow stem poppet valve blank. This blank has a solid head of finished shape, a neck of finished shape, and a hollow stem which is thicker than the desired valve stem. This thickened hollow stem is drawn down by extruding operations into valve stem diameter and thickness. The method of this invention greatly lessens the cost of producing hollow stem valves since extruding operations are only used at the finish to form the valve stem and since the upsetting operations are fast and inexpensive.

It is then an object of this invention to produce hollow stem poppet valves by upsetting operations for eliminating heretofore required expensive extruding and machining operations.

Another object is to forge hollow poppet valve blanks on a header machine.

A further object of the invention is to provide a process for forming hollow stem poppet valve blanks from solid bar stock without separating the blanks from the bar stock until after the last upsetting operation.

A still further object of the invention is to provide a method for simultaneously die shaping and upsetting metal into hollow poppet valve form.

Other and further objects of this invention will be apparent to those skilled in the art from the following detailed description of the annexed sheets of drawings which, by way of an example only, illustrate one embodiment of the invention.

On the drawings:

Figure 1 is a somewhat diagrammatic top plan view, with parts in horizontal cross-section, of a combination upsetting and die shaping machine used for the production of valves in accordance with this invention.

Figures 2 to 7 are plan views with parts broken away and shown in horizontal cross-section of the various valve blanks and the finished valve produced in accordance with this invention.

Figures 8 and 9 are horizontal cross-sectional views, with parts in plan, illustrating the first die shaping and upsetting operation in accordance with this invention and showing the dies in opened and closed positions.

Figures 10 and 11 are views similar to Figures 8 and 9 but illustrating the second die pressing and upsetting operation with the dies in opened and closed positions.

Figures 12 and 13 are views similar to Figures 8 and 9 illustrating the third die shaping and upsetting operation and showing the dies in opened and closed positions.

Figures 14 and 15 are views similar to Figures 8 and 9 but illustrating the fourth die pressing and upsetting operation with the dies in opened and closed positions.

Figure 16 is a front elevational view taken along the line XVI—XVI of Figure 14.

As shown on the drawings:

In Figure 1 the reference numeral 10 designates generally an upsetting and die pressing machine that can be used to carry out the method of this invention. The machine 10 has a stationary bed 11 for a stationary die, and a horizontally reciprocal carriage 12 for a movable die to coact with the die on the bed 11. A carriage 13 is mounted for horizontal sliding movement toward and away from the die bed 11. A tool holder 14 is carried by the carriage 13.

A crank shaft 15 has a fly-wheel drive 16 and a clutch 17 is provided for disengaging the crank shaft from the fly-wheel drive 16. The crank shaft has a first crank 15a driving a connecting rod 18 which rod actuates the link 19 to reciprocate the movable die carriage 12. The crank shaft has a second crank arm 15b driving a connecting rod 20 to slide the carriage 13 toward and away from the die bed 11.

The front end of the machine has a feed opening 21 for insertion of a solid metal bar, preferably in the form of a cylindrical rod 22. The rod is preferably heated to forging temperatures.

Since, according to this invention, four die pressing and upsetting operations provide a hollow stem, solid head valve blank which can easily be formed into a finished hollow poppet valve, four machines of the type illustrated in Figure 1 will be used, one for each of the four operations. The machine of Figure 1 is illustrated as being equipped with dies and a piercing tool for the second operation. Alternately a single machine could be equipped with the required four sets of dies and piercing upsetting tools arranged in series along the length thereof so that an operator could move the bar with the partially formed blank on the end thereof from one set of dies to the next.

As shown in Figures 8 and 9, the first operation involves the necking of the bar stock in spaced relation from its leading free end and the upsetting of a nubbin on the free end of the bar stock. For this purpose a stationary die 23 is provided with a semi-cylindrical die face 23a along most of the length thereof. The receiving end of the die 23 has a rounded bead shaped semi-cylindrical depression 23b. The other end of the die has a larger diameter semi-cylindrical portion 23c. The portions 23a and 23c are connected through a tapered portion 23d. A mating reciprocal die 24 coacts with the die 23 and has forming recesses 24a, 24b, 24c and 24d complementary with the recesses of the die 23 and cooperating therewith to provide complete cylindrical recesses. The bar 22 is inserted between the opened dies 23 and 24 as shown in Figure 8 to rest on the bead 23b. The leading end of the bar terminates somewhat inwardly from the end face of the die portion 23c. A stop (not shown) can be provided to limit the degree of insertion of the rod.

An upsetting plunger tool 25 is provided with a reduced diameter leading end portion 25a and a flat shoulder 25b surrounding the portion 25a.

In operation the die 23 would be mounted on the bed 11 of the machine 10, while the die 24 would be mounted on the carriage 12 of the machine. The tool 25 would be mounted in the tool holder 14 of the machine.

The die 24 is first reciprocated several times relative to the die 23 to hammer the rod 22 locally with the die portions 23b and 24b for necking down the rod. During this hammer treatment the rod is rotated in the die 23. When this necking down operation is completed the dies are closed and the tool 25 is rammed into the die recesses 23c and 24c to upset and partly pierce the end portion of the rod 22 which is thus securely gripped in the die. A blank 26 is thus formed with a necked down portion 26a at one end thereof, a cylindrical portion 26b extending therefrom, a tapered neck portion 26c at the other end of the cylindrical portion 26b, a cylindrical head or nubbin 26d at the large end of the tapered portion 26c and a recess 26e in the top of the head 26d. The blank 26 as best illustrated in Figure 2 is integral with the rod 22 and the leading end portion of the rod has an upset partially pierced nubbin formed thereon.

In the second operation illustrated in Figures 10 and 11, the blank 26 and the adjacent portion of the rod 22 is further die shaped and upset to complete the neck forming operation, to gather stock for forming the valve head, and to increase the depth of the recess in the nubbin end of the blank. For this purpose a stationary or fixed die 30 is equipped with a spring pressed horizontally sliding die 31 and a horizontally reciprocal die 32 is equipped with a mating spring pressed horizontally slidable die 33. A piercing tool 34 coacts with the sliding dies 31 and 33.

The die 30 has a track portion 30a for slidably supporting the die 31. The die 32 has a similar track 32a for its sliding die 33. Pins 35 are carried by the dies 30 and 32 to project into holes 36 in the front faces of the dies 31 and 33. Coiled springs 37 surround the pins 35 and act on the dies to urge the same against stops 30b and 32b at the inner ends of the dies 30 and 32.

This die 30 has a semi-cylindrical rod gripping portion 30c in the top face thereof extending from the inlet end of the die for an appreciable distance to grip a length of the rod 22 in spaced relation from the neck 26a of the blank 26 on the rod. The forward end of this rod tripping portion 30c is surrounded by a cylindrical wall 30d bottomed by a shoulder 30e. The front end of the portion 30c has a flat front face 30f. The die 32 has a cooperating gripping portion 32c, wall 32d, shoulder 32e and front face 32f.

The sliding die 31 has a cylindrical recess 31a adapted to receive the wall 30d in sliding relation therein. This recess 31a extends to a rounded bead portion 31b forming a recess to receive the neck 26a of the blank 26. As shown in Figure 10, however, the bead 31b extends down to the level of the recess 31a and beyond the neck 26a for changing the contour of the neck. The bead portion 31b terminates remote from the recess 31a at a somewhat higher level to a reduced diameter segmental cylindrical recess 31c. This recess 31c extends to a tapered shoulder portion 31d which merges into a segmental cylindrical recess 31e of larger diameter than the recess 31c but of smaller diameter than the recess 31a. The recess 31e is adapted to receive the nubbin 26d of the blank 26. When the neck 26a is seated on the bead 31b of the die 31, the head portion 26d of the blank is inwardly from the rear end face of the die 31 as shown in Figure 10.

The sliding die 33 has cooperating die faces 33a to 33e, inclusive shaped the same as the die faces 31a to 31e to mate therewith and form the blank 38 of Figures 3 and 11, as hereinafter described.

The piercing and upsetting tool 34 has a conically pointed end 34a, a cylindrical shank 34b, a flat shoulder 34c at the end of the shank, a head portion 34d with a diameter adapted to snugly fit in the recesses 31e and 33e of the dies 31 and 33, and a shoulder 34e at the end of the head portion 34d.

As shown in Figure 10, the springs 37 hold the sliding dies 31 and 33 against the abutments 30b and 32b of the opened dies 30 and 32. When the dies 30 and 32 are brought together, the blank 26 therein is initially deformed to change the contour of the neck 26a thereof into conformity with the die faces 31b and 33b. The portions 31a and 33a of the sliding dies fit around the portions 30b and 32b of the dies 30 and 32, and after the dies are closed the rod 22 is tightly gripped by the die portions 30c and 32c and the plunger 34 enters the central portion of the recess 26e of the blank 26 to start piercing the blank. This piercing operation and the subsequent upsetting operation brings about a sliding of the dies 31 and 32 against the pressures of the springs 37 to eventually bottom the dies on the shoulders 30e and 32e of the dies 30 and 32. Since the die portions 31b and 33b of the sliding dies tightly grip the blank being acted on to prevent longitudinal movement of the blank and since the die portions 30c and 32c grip the rod 22 in spaced relation from the neck portion of the blank as the dies 31 and 33 slide away from the abutments 30b and 32b that portion of the rod which lies between these gripped portions and within the die recesses 31a and 33a is upset or gathered to form a cylindrical head portion 38a of the same diameter as the recesses 31a and 33a. This head 38a is bottomed on the end faces 30f and 32f. Since the faces are flat and at right angles to the recess walls 31a and 32a, the head 38a will have a flat top extending outwardly from the rod 22. The dies 31 and 33 in their fully retracted position are bottomed on the shoulders 30e and 32e of the dies 30 and 32.

The die portions 31b and 33b form a completed neck 38b for the blank 38 as shown in Figure 11 and this neck extends from the head 38a to a cylindrical portion 38c on the die walls 31c and 33c. This cylindrical portion is of the same diameter as the portion 26b of the blank 26 from which the blank 38 is formed.

The piercing and upsetting tool 34 expands and upsets the major part of the blank portion 26b of the blank 26 to form a cylindrical portion 38d of increased diameter contoured by die walls 31e and 33e. This cylindrical portion 38d merges with the cylindrical portion 33c through a tapered portion 38e formed by the die walls 31d and 33d. The blank portion 38d is pierced by the pointed end 34a and the shank 34b of the tool 34. The hole 38f formed in the blank by this piercing portion of the tool extends from the end of the portion 38d of the blank to the tapered portion 38e of the blank 38.

In order to upset the portion 38d from the nubbin 26d and cylindrical portion 26b of the blank 26, the head portion 34d of the piercing tool 34 enters the dies 31 and 33 as shown in Figure 11 so that its end face 34c thrusts against the bar stock within the confines of the dies. The shoulder 34e of the tool 34 is bottomed on the dies 31 and 33 after the upsetting operation is completed.

In this second die pressing and upsetting operation illustrated in Figures 10 and 11, the blank 38 is formed from the blank 26 and this operation completes the necking of the stock, gathers stock for forming the valve head, and pierces a portion of a stem for the valve. The blank 38 still remains integrally attached to the rod 22.

In the third die pressing and upsetting operation illustrated in Figures 12 and 13, the blank 38 from the second operation is further formed to provide a valve head and to increase the piercing of the stem and neck to the required depth. For this purpose a stationary die 40 slidably supports a die 41 on the track 40a. A movable die 42 slidably supports a die 43 on the track 42a thereof. A piercing and upsetting tool 44 coacts with the sliding dies.

The dies 40 and 42 carry pins 45 in their front faces. These pins 45 project horizontally from recesses in the dies 40 and 42 to enter recesses 46 in the front faces of the sliding dies 41 and 43. Coiled springs 47 surround the pins 45 to act on the sliding dies 41 and 43 for urging the same against abutments 40b and 42b of the dies 40 and 42.

The die 40 has a semi-cylindrical rod gripping wall portion 40c terminating in a flat shoulder or face 40d adapted to receive the head 38a of the blank 38 thereagainst. The die 42 has a similar segmental semi-cylindrical rod gripping wall portion 42c and end face 42d.

The sliding die 41 has a semi-valve head shaped recess 41a in the front end face thereof. This recess 41a has an outer cylindrical part and an inner tapered part to shape the peripheral edge and seating face of a poppet valve head. The tapered part merges with a bead or rib 41b of the same shape as the bead or rib 31b of the die 31 since the neck 38b of the blank 38 is not to be changed in contour. This bead 41b extends to a semi-cylindrical wall 41c defining a recess for receiving the head portion 38d of the blank 38. This recess extends to the back end face of the die 41.

The sliding die 43 has recesses and walls complementing the above defined recesses and walls of the die 41 including a semi-poppet valve head forming recess 42a, a bead 42b and a semi-cylindrical recess 42c.

The piercing and upsetting tool 44 has a conically pointed end 44a, a reduced diameter cylindrical shank 44b extending from the large end of the pointed end 44a, and a tapered shoulder portion 44c extending from the shank 44b to an enlarged cylindrical shank portion 44d. This shank portion 44d is of appreciable length and terminates at a flat shoulder 44e. A cylindrical head 44f is formed on the tool 44 for fitting snugly in the recess defined by the walls 41c and 42c of the dies 41 and 43. This head terminates in a shoulder 44g adapted to engage the back end faces of the dies 41 and 43.

As shown in Figure 13 when the dies 40 and 42 are closed the portions 40c and 42c thereof tightly grip a length of the rod 22 adjacent the head 38c of the blank 38a thereon. The piercing and upsetting tool 44 is then rammed into the blank and acts on the sliding dies 41 and 43 to deform the blank 38 into a blank 48. This blank 48 has a valve head portion 48a backed by the flat faces 40d and 42d of the dies 40 and 42 and shaped in the die recesses 41a and 43a. The blank 48 has a neck 48b extending from the head 48a to a cylindrical stem forming portion 48c. This stem portion 48c is of the same diameter as the portion 38d of the blank 38 but the portions 38c and 38e of this blank are enlarged down to the neck 48b. The piercing tool forms a small diameter bore 48d in the neck 48b and a larger diameter bore 48e in the stem portion 48c.

As shown in Figure 4, the blank 48 is still attached to the rod 22.

The blank 48 from the third operation has a pierced stem hole of the required depth, a straight cylindrical valve stem portion, a shaped valve head, and a valve neck. The cylindrical stem portion is of larger diameter and of greater thickness than the stem in the final valve to be formed from the blank by extruding and shaping operations.

The fourth operation, according to this invention, sizes the pierced hole in the stem and squares the bottom of this hole in the valve head. It also finish sizes the valve head and severs the blank from the rod.

As shown in Figures 14, 15 and 16, dies 50 and 51, a cutter 52 with a knife 53 thereon, and a piercing tool 54 perform the fourth operation.

As shown in Figure 14, the die 50 has a head recess 50a, a neck recess 50b, and a stem recess 50c. The die 51 has similar recesses 51a, 51b and 51c, respectively. A knife 52 depends from the die 51 at the head end of the head recess 51a. The knife is adapted to slide in front of the front face 50d of the die 50 and form an abutment wall for the head of the blank when the dies are closed. This die 50 has a wall 50e supporting the rod 22 when it is cut from the blank 48.

When the die 51 is closed on the die 50 as shown in Figure 15 the knife 52 severs the rod from the head of a blank 55 that is formed from the blank 48 by the dies and the tool 54. The severed rod 22 drops onto the die wall 50e.

The blank 55 has a valve head 55a of finished contour and size, a valve neck 55b of finished contour and size, and a cylindrical stem 55c.

As shown in Figure 14, the tool 54 has a flat leading end 54a surrounded by a small tapered portion 54b which diverges to a small cylindrical shank 54c. The shank 54c extends to a tapered portion 54d. The large end of the tapered portion terminates at a larger diameter cylindrical shank 54e which extends for a considerable distance to a flat shoulder 54f of a head 54g. The head 54g terminates at a flat shoulder 54h.

As shown in Figure 15, the knife 52 abuts the head 55a of the valve blank 55 when the dies 50 and 51 are closed and when the tool 54 is forced into the dies 50 and 51, the flat end 54a thereof forms a flat bottom 55d for the hole in the head portion of the blank. This hole has a small diameter portion 55e extending from the flat end thereof through the neck portion of the valve to a larger diameter bore 55f formed by the cylindrical shank 54e of the tool. This larger bore 55f extends to the end of the stem 55c which is acted on by the shoulder 54f of the head portion 54g.

The fourth operation thus converts the blank 48 from the third operation into the blank 55 shown in Figure 5, by a die pressing, piercing, and cutting operation.

The blank 55 can be extruded around an inserted pin or mandrel (not shown) to form the blank 60 of Figure 6. This blank 60 has a head 60a and a neck 60b which is the same as the head 55a and neck 55b of the blank 55. However, the blank 60 has a stem 60c of the same diameter as the small diameter of the neck. This stem 60c is formed by extruding the stem 55c of the blank 55 around a pin having the same diameter as the portion 55e of the bore. The extruding operation reduces the diameter of the blank portion 55c and a straight cylindrical bore 60d extends from the head 60a to the tip end of the stem portion. This tip end of the stem portion has a thickened nubbin 60e formed by upsetting the tip end of the extruded stem 60c.

The blank 60 of Figure 6 is formed into a finished poppet valve 61 by partially filling the stem bore 60d of the blank with coolant C such as sodium or the like and by collapsing the nubbin 60e to form a solid tip end 61a for the valve. The finished valve 61 has a stem cavity extending from the head down to the tip end of the valve and coolant in this cavity dissipates heat from the head down through the stem of the valve.

From the above descriptions it should be understood that this invention involves a method for forming poppet valves from bar stock, heated to forging temperatures, by upsetting and piercing operations without loss of metal. Only four operations are necessary to produce a valve blank which is easily extruded, sealed and finish machined to provide a coolant filled poppet valve.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. The method of making hollow poppet valves from bar stock which comprises die pressing a local portion of a metal rod in spaced relation from the leading end of the rod to form a reduced diameter neck in the rod, upsetting the leading end of the rod to form an increased diameter nubbin thereon, partially piercing the end of the nubbin to form a recess therein, die pressing the neck portion of the rod into the shape of a poppet valve neck, piercing the recessed nubbin of the rod to increase the diameter of the rod and to form a hole in the increased diameter portion of the rod, upsetting a portion of the rod on the other side of the neck to form a cylindrical head thereon, piercing the portion of the rod between the pierced increased diameter portion and the neck of the rod to increase the diameter of said portion to the diameter of the previously pierced portion, piercing the neck portion of the rod, upsetting the head portion of the rod into poppet valve head shape, sizing the pierced hole in the rod, forming a flat bottom on the pierced hole, and shearing the resulting blank from the rod.

2. The method of forming hollow stemmed solid head metal poppet valves from a solid rod which comprises locally die pressing a solid metal rod in spaced relation from the leading end thereof to form a reduced diameter neck portion, piercing and upsetting that portion of the rod between the neck portion and the free end thereof to form a hollow stem, locally upsetting a portion of the length of the rod on the other side of said neck portion to form a cylindrical head thereon, die pressing said cylindrical head into valve head shape, and severing the rod from the head end of the blank.

3. The method of making hollow stemmed poppet valves from a solid metal rod which comprises locally hammering a portion of the rod in spaced relation from the leading end thereof to form a reduced diameter neck on the rod, pressing the end face of the rod to bump up a nubbin of increased diameter thereon, gripping the neck portion of the rod, gripping a portion of the rod in spaced relation from said neck portion on the side of the neck remote from the free end of the rod, gathering rod metal between said gripped portions for forming an enlarged head on the rod, piercing the rod through the free end thereof into said neck portion, pressing the gathered head portion of the rod into poppet valve head shape, and severing the resulting blank from the rod to provide a valve blank having a hollow stem, a poppet valve neck and a poppet valve head.

4. The method of forging hollow stemmed solid head metal poppet valves from a solid metal rod which comprises necking down a local portion of a solid metal rod in spaced relation from the end of the rod, bumping up a nubbin of increased diameter on the end of the rod, piercing and upsetting the nubbin end of the rod to form a hollow stem portion of increased diameter, gathering metal adjacent the neck portion of the rod from rod metal on the side of the neck portion that is remote from the nubbin, upsetting the gathered metal into poppet valve head shape without severing the metal from the rod, piercing the neck of the valve to extend the pierced hole from the stem into the neck, and severing the rod from the head end of the resulting blank.

5. In the method of making a hollow stemmed poppet valve from heated solid metal bar stock, the steps which comprise gripping spaced localized portions of the bar stock, upsetting and piercing the metal of the bar stock between the end of the bar and the adjacent gripped portion to form a hollow stem portion, pressing said portions toward each other to gather metal therebetween, and upsetting the gathered metal into poppet valve head shape.

6. The method of forming a hollow stemmed valve blank from solid bar stock in four operations which comprises die pressing and upsetting the heated leading end portion of a solid metal rod to form a first blank attached to the rod with a nubbin on the end thereof and a reduced diameter neck in spaced relation from the end, piercing the nubbin end of the blank to form a hollow stem portion extending into spaced relation from the neck portion, gathering metal from the rod adjacent the neck of said blank to form a cylindrical head adjacent said neck and thereby form a second blank still attached to the rod, upsetting the gathered metal of the second blank into poppet valve head shape, simultaneously piercing the hollow stem portion of the second blank to extend the hole thereof into the neck and thereby form a third blank still attached to the rod, sizing the head, stem and hole of the third blank and simultaneously severing the rod to form a fourth blank having a poppet valve head, a hollow poppet valve neck and a hollow stem portion adapted to form a hollow stem for the valve.

7. In the method of forming hollow poppet valves from solid bar stock the steps which comprise forming a reduced diameter neck in a solid rod in spaced relation from the end of the rod, upsetting a portion of the rod between the neck and the end of the rod, piercing said last mentioned portion to form a hollow poppet valve stem, upsetting a portion of the rod adjacent the neck to form a poppet valve head, and thereafter severing the resulting blank from the rod.

8. In the method of making hollow stemmed poppet valves from bar stock, the steps which comprise locally die-pressing a solid metal rod in spaced relation from the leading end thereof to form a reduced diameter neck portion, piercing the rod between the neck portion and the leading end of the rod to form a hollow stem, and locally upsetting a portion of the length of the rod on the other side of the neck portion to form a head.

9. The method of forming hollow stemmed poppet valves which comprises locally die-pressing a solid metal rod in spaced relation from the leading end thereof to form a reduced diameter portion, piercing that portion of the rod between the reduced diameter portion and the leading end of the rod to form a hollow stem, upsetting a portion of the length of the rod on the other side of the reduced diameter portion to form a valve head, and thereafter severing the resulting headed hollow stemmed blank from the rod.

10. The method of forming hollow poppet valves without loss of metal which comprises locally hammering a portion of a solid metal rod in spaced relation from the leading end of the rod to form a reduced neck on the rod, upsetting the leading end portion of the rod, piercing the upset leading end portion to form a valve stem, and upsetting the portion of the rod adjacent the neck on the side of the neck remote from the free end of the rod for forming an enlarged head on the rod, and thereafter severing the resulting blank from the rod.

PERRY E. COOLEY.

REFERENCES CITED

The following references are of record in the file of this patent:

UNITED STATES PATENTS

| Number | Name | Date |
|---|---|---|
| 126,495 | Seward | May 7, 1872 |
| 376,673 | Mutimer | Jan. 17, 1888 |
| 717,886 | Mercader | Jan. 6, 1903 |
| 724,270 | Ehrhardt | Mar. 31, 1903 |
| 1,475,939 | Ditson | Dec. 4, 1923 |
| 1,503,678 | Wineman | Aug. 5, 1924 |
| 2,177,192 | Scrimgeour | Oct. 24, 1934 |
| 2,341,469 | Newall | Feb. 8, 1944 |